United States Patent
Vacanti

(10) Patent No.: US 7,705,773 B2
(45) Date of Patent: Apr. 27, 2010

(54) SELF-CALIBRATING A RADAR ALTIMETER BASED ON A SIMULATED RETURN SIGNAL

(75) Inventor: David C. Vacanti, Renton, WA (US)

(73) Assignee: Honeywell International Inc., Morristown, NJ (US)

( * ) Notice: Subject to any disclaimer, the term of this patent is extended or adjusted under 35 U.S.C. 154(b) by 147 days.

(21) Appl. No.: 11/306,183

(22) Filed: Dec. 19, 2005

(65) Prior Publication Data

US 2007/0139261 A1 Jun. 21, 2007

(51) Int. Cl.
*G01S 7/40* (2006.01)
(52) U.S. Cl. .................. 342/169; 342/174
(58) Field of Classification Search .......... 342/169
See application file for complete search history.

(56) References Cited

U.S. PATENT DOCUMENTS

| | | | |
|---|---|---|---|
| 2,622,241 A * | 12/1952 | Keizer .................. | 342/169 |
| 2,713,160 A * | 7/1955 | Trachtenberg et al. ...... | 342/102 |
| 3,427,615 A * | 2/1969 | Hubka .................. | 342/122 |
| 4,806,935 A | 2/1989 | Fosket et al. | |
| 4,945,360 A | 7/1990 | Trummer et al. | |
| 5,160,933 A * | 11/1992 | Hager .................. | 342/174 |
| 5,172,123 A * | 12/1992 | Johnson ................ | 342/200 |
| 5,268,692 A * | 12/1993 | Grosch et al. ........... | 342/70 |
| 5,270,720 A * | 12/1993 | Stove .................. | 342/174 |
| 5,325,095 A * | 6/1994 | Vadnais et al. .......... | 342/22 |
| 5,495,202 A * | 2/1996 | Hsu .................... | 327/113 |
| 5,714,948 A | 2/1998 | Farmakis et al. | |
| 5,757,307 A * | 5/1998 | Nakatani et al. ......... | 342/70 |
| 6,072,426 A | 6/2000 | Roos | |
| 6,107,956 A * | 8/2000 | Russell et al. .......... | 342/70 |
| 6,114,985 A * | 9/2000 | Russell et al. .......... | 342/169 |
| 6,255,984 B1 | 7/2001 | Kreppold et al. | |
| 6,317,074 B1 * | 11/2001 | Johnson ................ | 342/82 |
| 6,384,770 B1 | 5/2002 | de Gouy et al. | |

(Continued)

FOREIGN PATENT DOCUMENTS

JP 56061667 A * 5/1981

OTHER PUBLICATIONS

European Patent Office, "European Search Report", Jul. 14, 2008, Published in: EP.

*Primary Examiner*—Thomas G Black
*Assistant Examiner*—Shelley Chen
(74) *Attorney, Agent, or Firm*—Fogg & Powers LLC

(57) ABSTRACT

Systems and methods for performing self calibration of a radar altimeter. An example system includes a first component that generates a simulated return signal based on one or more range values. A transmitter generates a transmission radar signal and a receiver processes the simulated return signal based on the transmission radar signal. A second component determines one or more calibration factors based on the processed simulated return signal and ideal return signal characteristics. The transmission radar signal is a fixed frequency signal and the first component includes a programmable frequency divider that creates at least on sideband of a known signal. A third component determines if the radar system is in at least one of a calibration mode or normal mode of operation. If the radar system is determined to be in a normal mode of operation, a fourth component applies the determined calibration factors to actual radar return signals.

14 Claims, 6 Drawing Sheets

U.S. PATENT DOCUMENTS

| | | |
|---|---|---|
| 6,392,586 B1 * | 5/2002 | Thordarson et al. .......... 342/169 |
| 6,407,697 B1 | 6/2002 | Hager et al. |
| 6,426,717 B1 | 7/2002 | Maloratsky |
| 6,437,730 B1 * | 8/2002 | Orlandi ....................... 342/122 |
| 6,445,334 B1 * | 9/2002 | Bradley et al. ................. 342/22 |
| 6,693,557 B2 * | 2/2004 | Arnold et al. ................ 340/933 |
| 7,161,527 B2 | 1/2007 | Vacanti |
| 7,239,266 B2 * | 7/2007 | Vacanti ........................ 342/120 |
| 7,274,323 B2 * | 9/2007 | Hester et al. ................. 342/103 |
| 7,302,237 B2 * | 11/2007 | Jackson et al. ................. 455/76 |
| 2002/0122000 A1 * | 9/2002 | Bradley et al. ................. 342/22 |
| 2003/0058133 A1 * | 3/2003 | Arnold et al. ................ 340/933 |
| 2003/0093187 A1 | 5/2003 | Walker |
| 2004/0135703 A1 * | 7/2004 | Arnold et al. ................ 340/933 |
| 2004/0174292 A1 * | 9/2004 | Isaji ............................. 342/70 |
| 2005/0003785 A1 * | 1/2005 | Jackson et al. ............... 455/260 |
| 2005/0007271 A1 * | 1/2005 | Isaji ............................. 342/70 |
| 2005/0128135 A1 * | 6/2005 | Hester et al. ................. 342/103 |
| 2005/0156780 A1 * | 7/2005 | Bonthron et al. ............. 342/107 |
| 2005/0225481 A1 * | 10/2005 | Bonthron .................... 342/175 |
| 2006/0044182 A1 * | 3/2006 | Vacanti ........................ 342/120 |
| 2007/0139261 A1 * | 6/2007 | Vacanti ........................ 342/174 |

* cited by examiner

US 7,705,773 B2

SELF-CALIBRATING A RADAR ALTIMETER BASED ON A SIMULATED RETURN SIGNAL

BACKGROUND OF THE INVENTION

Frequency Modulated/Continuous Wave (FM/CW) Radar Altimeters need ways in which to verify proper operation and accuracy of data supplied to aircraft flight controls. In the current radar altimeters, self-calibration is performed in an open loop manner using Bulk Acoustic Wave (BAW) devices. The present open loop design requires hand turning of a Voltage Control Oscillator (VCO) based on an analysis of the outputted signal as compared to an expected signal. Components of the open loop system, such as the BAW are relatively expensive and fail to allow detection of non-linearities in tuning, absolute frequency errors, frequency drift versus temperature, and receiver amplitude/phase errors.

Therefore, there exists a need to replace expensive BAW devices and to implement a calibration system that more effectively corrects inaccuracies.

BRIEF SUMMARY OF THE INVENTION

The present invention provides systems and methods for performing self calibration of a radar altimeter. An example system includes a first component that generates a simulated return signal based on one or more range values. A transmitter generates a transmission radar signal and a receiver processes the simulated return signal based on the transmission radar signal. A second component determines one or more calibration factors based on the processed simulated return signal and ideal return signal characteristics.

The transmission radar signal is a fixed frequency signal and the first component includes a programmable frequency divider that creates at least one sideband of a known signal.

In another aspect, a third component determines if the radar system is in at least one of a calibration mode or normal mode of operation. If the radar system is determined to be in a normal mode of operation, a fourth component applies the determined calibration factors to actual radar return signals.

BRIEF DESCRIPTION OF THE SEVERAL VIEWS OF THE DRAWING

The preferred and alternative embodiments of the present invention are described in detail below with reference to the following drawings.

DETAILED DESCRIPTION OF THE INVENTION

Figure 1:
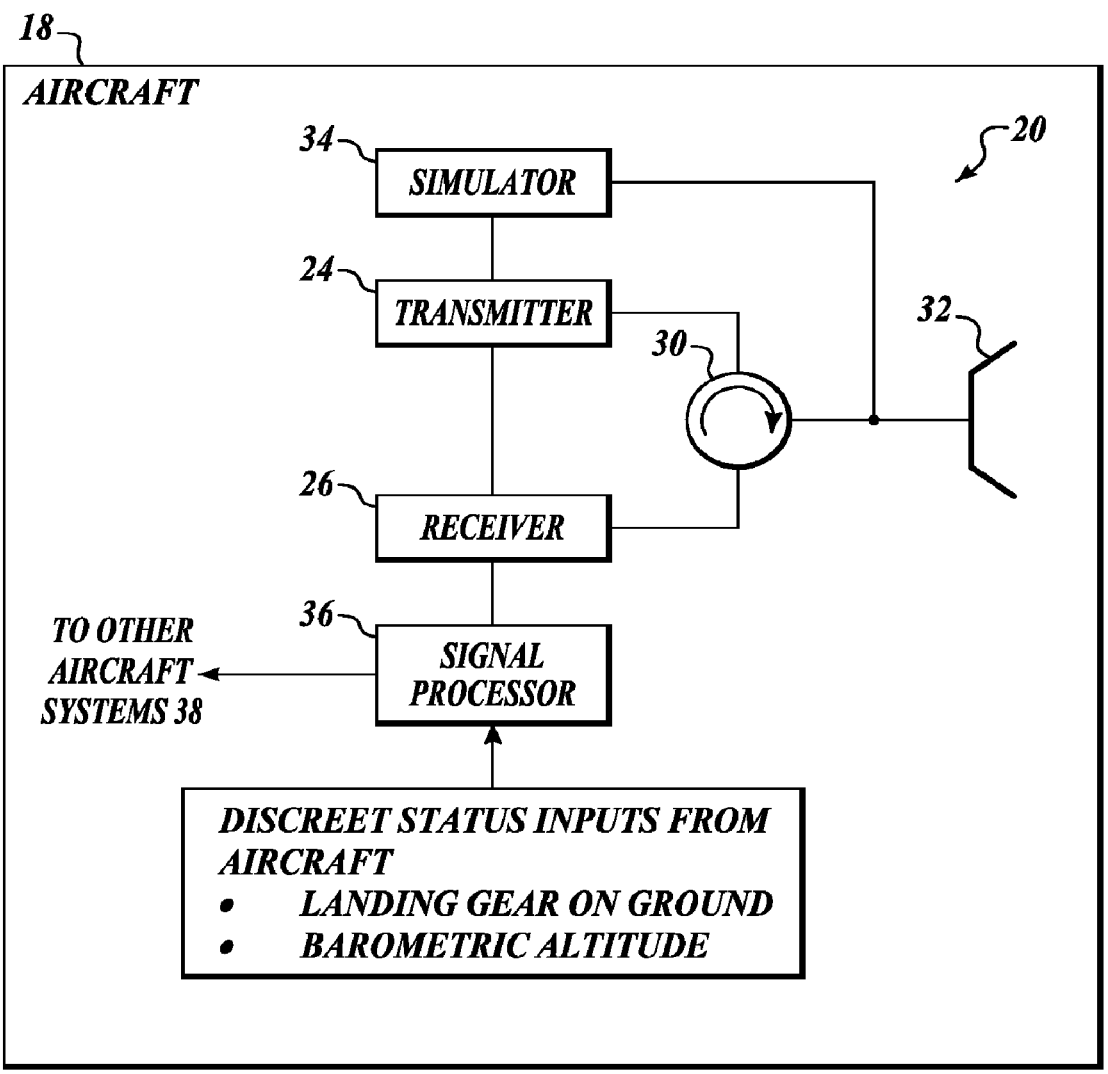
FIGS. 1-3 illustrate block diagrams of system components formed in accordance with embodiments of the present invention.
Figure 2:
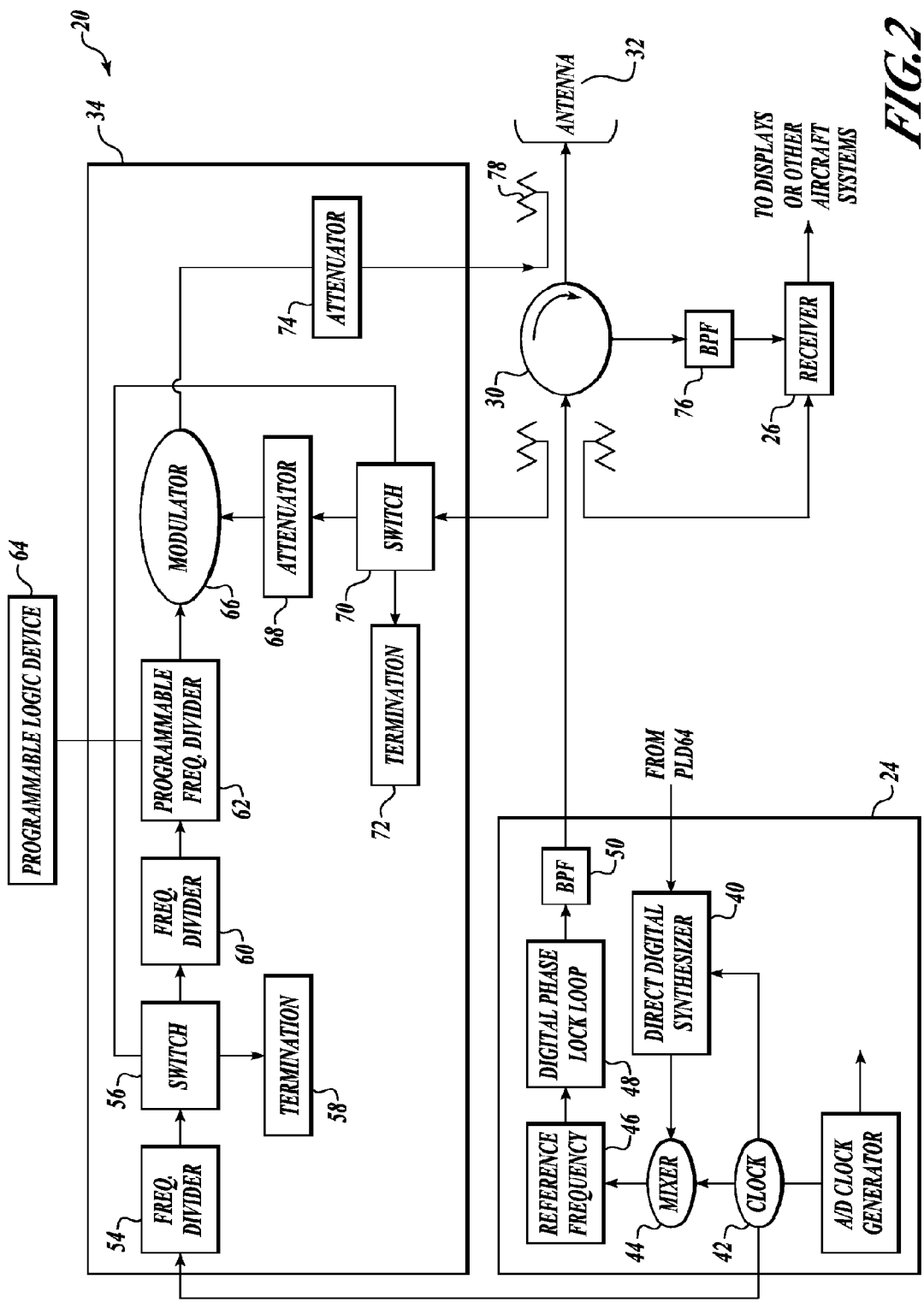

FIGS. 1 and 2 illustrate an example of a self-calibrating, radar altimeter 20 used in an aircraft 18 and formed in accordance with an embodiment of the present invention. The radar altimeter 20 includes a transmitter 24, a receiver 26, and a signal simulator 34. If the radar altimeter 20 is a single antenna radar altimeter, then the altimeter 20 includes a signal circulator 30 and a single antenna 32. Dual antenna radar systems may be used.

During normal operation of the radar altimeter 20, the transmitter 24 generates a radar signal that is radiated by the antenna 32. The antenna 32 then receives a delayed response of the transmitted signal and sends it to the receiver 26 via the circulator 30. The receiver 26 processes the delayed response signal and then delivers it to a signal processor 36 and then to other aircraft systems 38. This normal mode of operation occurs when the radar altimeter 20 is activated within a predefined distance above the ground. When the aircraft 18 is outside of threshold limits for the normal mode of operation for the radar altimeter 20, the radar altimeter 20 is placed in a calibration mode. The signal processor 36 determines the altitude above the ground and determines the mode of operation in addition to monitoring status signals from the aircraft, such as "Landing Gear on Ground" and "Barometric Altitude".

Figure 3:
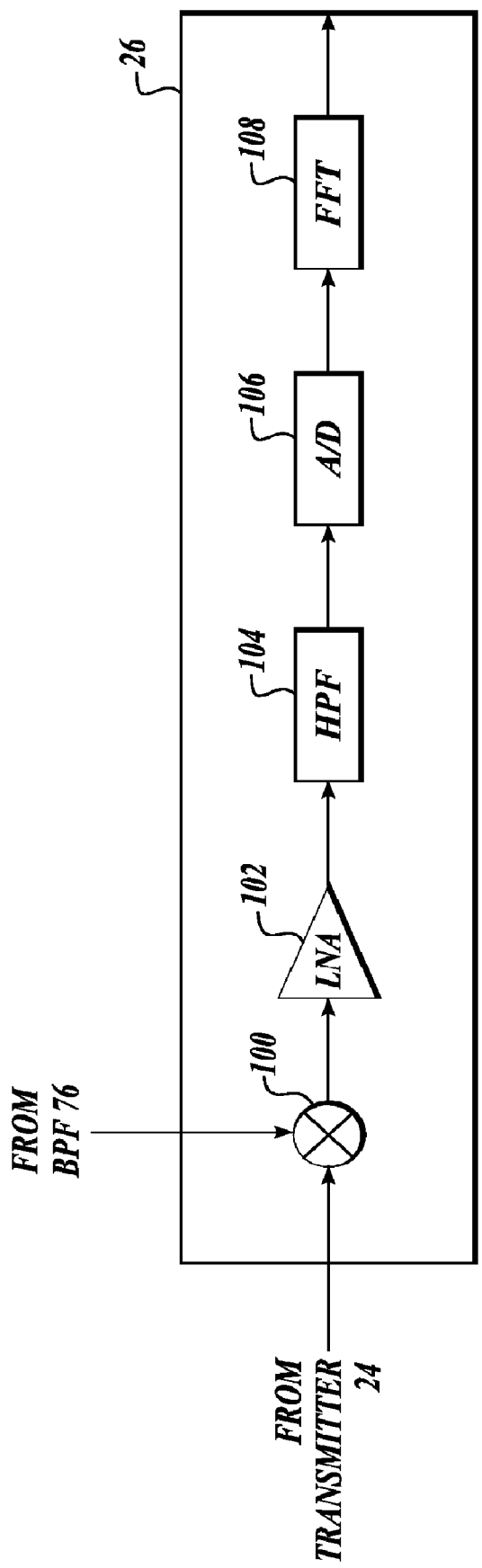

In the calibration mode of operation, the signal simulator 34 generates a response signal and sends it to the receiver 26 via a coupler 78 and the circulator 30. The transmitter 24 generates a fixed frequency signal that is compared to the signal generated by the signal simulator 34 in the receiver mixer 100 (FIG. 3). The signal processor 36 generates calibration factors if the signal outputted by a Fast Fourier Transform (FFT) 108 (FIG. 3) differs from an ideal signal level. Then, during normal operation of the radar altimeter 20, the determined calibration factors stored in signal processor memory are applied by the signal processor 36 to the signals produced by the FFT 108.

FIG. 2 illustrates components of the transmitter 24 and signal simulator 34 for performing the signal generations during the calibration mode of operation. When an external controller, such as a Programmable Logic Device (PLD) 64, is commanded into a calibration mode of operation, a signal is sent to a Direct Digital Synthesizer (DDS) 40 that is included in the transmitter 24. In response, the DDS 40 generates a fixed frequency signal that is mixed with a clock signal from a clock 42 at a mixer 44. The sum of the clock signal and the DDS signal forms the reference frequency 46. The reference signal causes the digital phase lock loop 48 to generate the required microwave output signal from the transmitter 24. The output of the digital phase lock loop 48 is sent through a Band Pass Filter (BPF) 50 and outputted from the transmitter 24 to the circulator 30. The clock signal is also sent to the signal simulator 34. The signal simulator 34 divides the clock signal by a first frequency divider 54 and passes the divided signal through a first switch 56 if the PLD 64 determines the system 20 is in a calibration mode of operation. If the system 20 is not in a calibration mode of operation, the receive signal is just sent to a 50 ohm resistive load termination 58. If the switch 56 is activated, the divided clock signal is further divided at a second frequency divider 60 and the results are passed through a programmable frequency divider 62 that is controlled by the PLD 64. The output of the programmable frequency divider 62 is a signal that includes side bands across a frequency range that correspond to expected frequencies in the receiver during normal operation. The output of the programmable frequency divider 62 is used to modulate an attenuated sampling (see coupling device) of the output of the transmitter 24 at a first attenuator 68. A second switch 70 controlled by the PLD 64 allows for transmitter signal sampling. If the switch 70 is in the off position, the sampled transmitter signal is terminated at a 50 ohm resistive load termination 72—other resistive load terminations may be used. The modulation is performed at a modulator 66 and is attenuated at a second attenuator 74. The modulated signal is sent to the circulator 30 via the coupler 78 to be received at the receiver 26 after passing through a Band Pass Filter (BPF) 76. The receiver 26 also receives the transmission signal outputted by the transmitter 24 that acts as the receiver reference signal. The programmable frequency divider 62 generates one desired frequency at a time that corresponds to one expected frequency in the receiver 26 during operation. By sequentially changing the commanded frequency division performed by the frequency divider 62, the simulator can generate the entire expected frequency range of the receiver 26, thereby permitting the amplitude calibration of the receiver 26 across the entire operating band.

FIG. 3 illustrates an example of components included within the receiver 26. The receiver 26 includes a double balance mixer 100 that receives the output of the BPF 76. The mixer 100 also receives a sample of the transmission signal as outputted from the transmitter 24 and mixes the two signals to produce an Intermediate Frequency signal (IF). IF=RF Frequency (Radio Frequency delayed received signal from BPT 76)−LO Frequency (Local Oscillator sampled transmitter signal).

The output of the mixer 100 is sent to a Low Noise Amplifier (LNA) 102. A low noise amplifier provides gain while contributing a very small amount of thermal noise to the received signal, usually less than 2 dB above the minimum theoretical noise power. The output of the LNA 102 is sent to a High Pass Filter (HPF) 104; that is designed to provide a 6 dB per frequency octave transfer function. The HPF output is sent to an analog to digital (A/D) converter 106. The digital output of the A/D converter 106 is sent through a Fast Fourier Transform (FFT) 108 to produce a digital version in the frequency domain. The output of the FFT 108 includes real (Re) and imaginary (Im) parts of the frequency that are used to calculate amplitude or phase. For example, Amp=$Re^2$+$Im^2$. The results of the amplitude determination are compared to ideal results for the amplitude that should be received by the receiver 26. This is described in more detail by example in FIG. 5 below.

Figure 4:
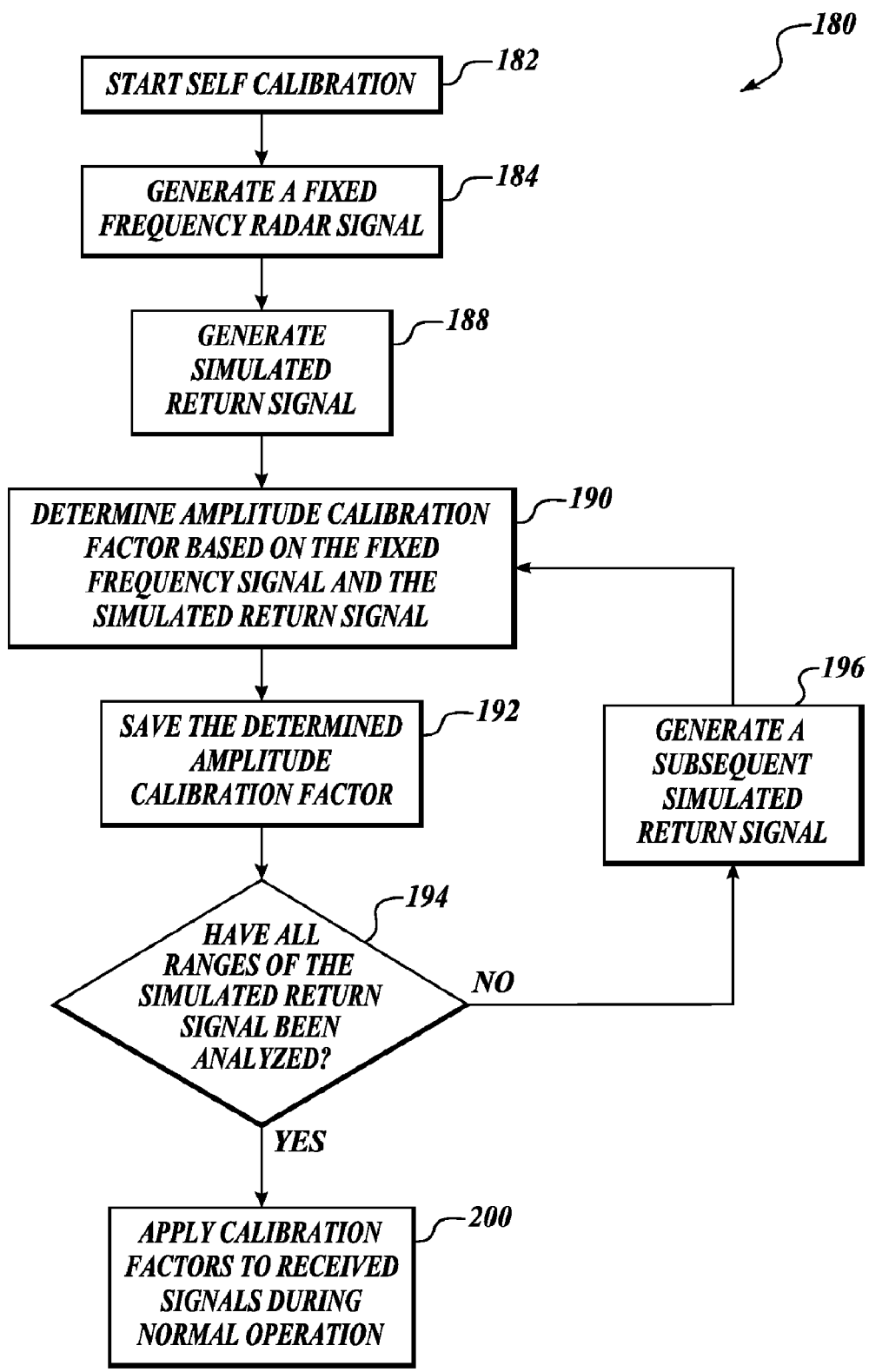
FIG. 4 illustrates a flow diagram of a process performed by the system components shown in FIGS. 1-3 in accordance with an embodiment of the present invention.

FIG. 4 illustrates a flow diagram of a process 180 as performed by the radar system 20 shown above in FIGS. 1-3. First, at a block 182, the self-calibration mode is initiated. Next, at a block 184, a fix frequency radar signal is generated. This fixed frequency radar signal is generated by the transmitter 24. At a block 188, a simulated return signal is generated. The simulated return signal is generated by the simulator 34. At a block 190, an amplitude calibration factor is determined based on the generated fixed frequency radar signal and the simulated return signal. The step performed at a block 190 is performed by the signal processor 36. At a block 192, the determined amplitude calibration factor is stored for later use during the normal mode of operation by the signal processor 36. At a decision block 194, the process 180 determines if all of the ranges (simulated return signal frequencies) have been analyzed. If not all of the ranges have been analyzed, then the process 180 goes to the block 196 where other simulated return signals are generated in order to simulate other ranges. If at the decision block 194 all of the ranges have been analyzed, then at a block 200, the calibration factors are applied to actual receive signals during the normal mode of operation.

The following is an example of operation of the system components shown above in FIGS. 1-3. In this example, the DDS 40 is instructed to generate a fixed frequency signal between 83 to 104 MHz, preferably 93.777 MHz. The clock signal is 384 MHz and when mixed with the output of the DDS 40 at the mixer 44, a 477.77 MHz signal is generated if the preferred DDS output is used. A 477.77 MHz signal is sent to the digital phase lock loop 48. The digital phase lock loop 48 multiplies the reference 477.77 MHz signal by a fixed factor, (in this case 9) to produce a 4.300 GHz signal.

In the signal simulator 34, the first frequency divider 54 steps the clock signal of 384 MHz down to 96 MHz. The second frequency divider 60 divides the signal by 128 and thus outputs a 0.75 MHz signal. The programmable frequency divider 60 outputs side bands at 11 KHz steps depending upon an instruction signal received from the PLD 64. The output of the programmable frequency divider 62 modulates an attenuated 4.3 GHz signal outputted by the transmitter 24 attenuated at the attenuator 74 in order to produce a 4.3 GHz signal having side bands at multiples of 11 KHz offsets as dictated by the output of the programmable frequency divider 62.

When the mixer 100 of the receiver 26 subtracts the unmodulated sample signal from the transmitter 24 from the modulated simulator signal injected at the coupler 78 (via the circulator 30 and the BPF 76), only the original sideband generated by the programmable divider 62 remains. This desired sideband lies within the passband of the LNA 102 and the HPF 104 and is processed by the FFT 108.

Figure 5:
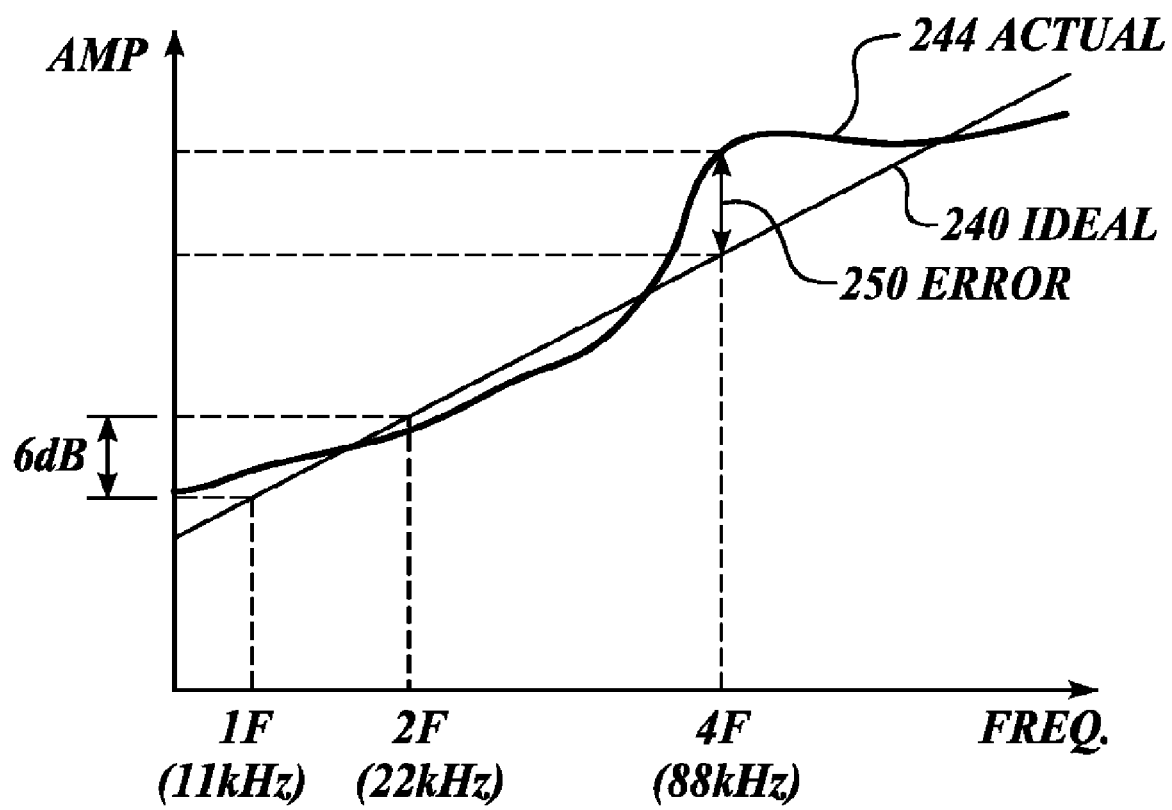
FIG. 5 illustrates a graph of an example signal processed by the receiver as compared to an ideally recovered signal.

Now referring to FIG. 5, an ideal amplitude response signal 240 is compared to an amplitude curve generated from the FFT at side band octaves based on an initial first octave of 11 KHz. The rise in slope of the ideal amplitude curve 240 is six decibels between octaves. An example of the output of the FFT 108 is the actual signal 244. The calibration factor is determined by comparing the actual amplitude curve 244 to the ideal amplitude curve 240 and taking the difference of the two in order to force the actual amplitude curve 244 to be linear like the curve 240. So by way of this example, the correction factor for the first octave 1F would be determined as follows. The amplitude of 1F is seen to be approximately −2 dB too low. Thus, applying that calibration factor of −+2 dB will amplify the response of 1F such that it just matches the ideal curve 240. The same would occur for the other octave positions in order to determine the calibration factor. Once the calibration factor is determined for each of the octaves, then the calibration factor is applied to an actual signal during normal radar altimeter operation.

Figure 6A:
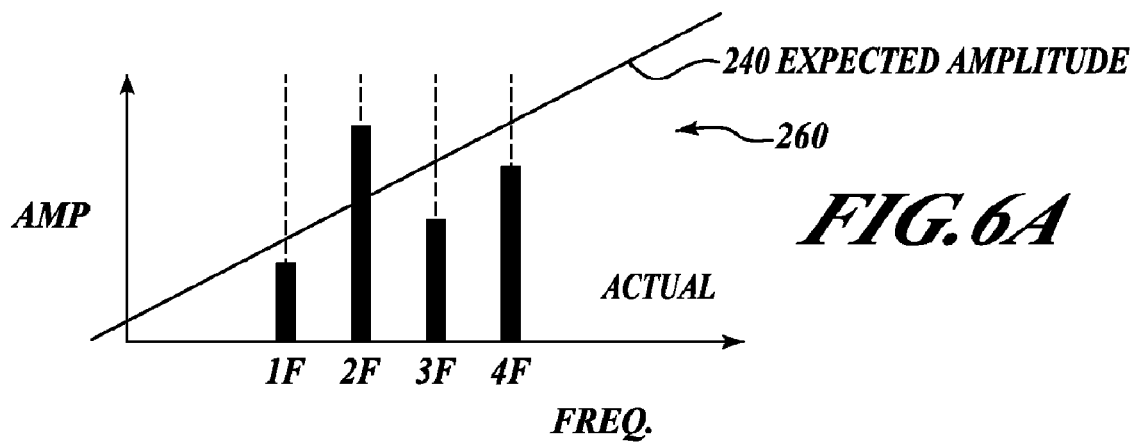
FIG. 6 illustrates example received signal corrections performed according to an embodiment of the present invention.
Figure 6B:
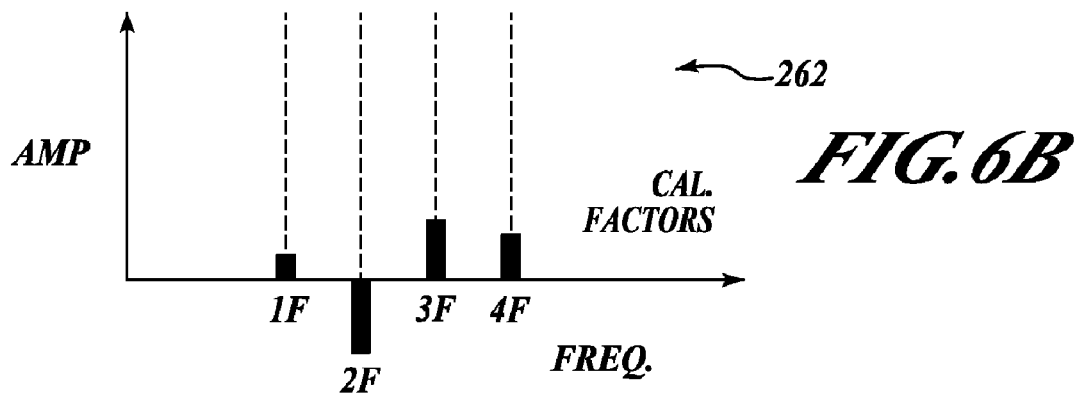
Figure 6C:
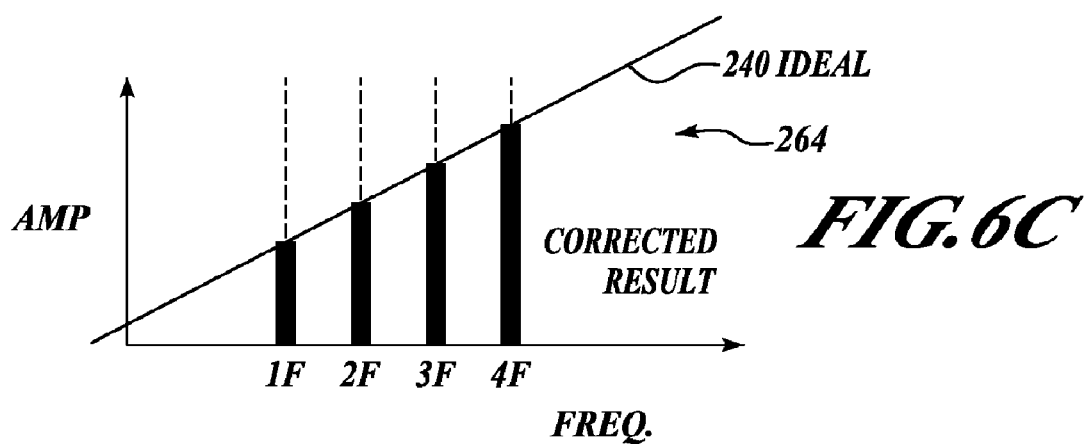

This is shown by example in FIG. 6C. FIG. 6A illustrates the FFT results 260 for an actual radar signal. FIG. 6B illustrates calibration factors 262 that were previously determined for the receiver 26 and FIG. 6C shows the corrected results 264 when combining the calibration factors to the actual signal.

Calibration factors for phase may also be generated in a similar manner as to that of amplitude except that the following equation applies: Phase=ATAN (Re÷Im).

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A method for self-calibrating a radar system, the method comprising:
providing a radar system comprising a Frequency Modulated Continuous Wave (FMCW) radar altimeter system that comprises a receiver for processing a simulated return signal based on a transmission radar signal, the receiver comprising:

a mixer configured to receive the simulated return signal and the transmission radar signal;
a low noise amplifier coupled to an output of the mixer;
a high pass filter coupled to an output of the low noise amplifier;
an analog to digital converter coupled to an output of the high pass filter; and
a fast Fourier transform unit coupled to an output of the analog to digital converter; and generating calibration factors for the radar system by a method comprising:
a) generating the simulated return signal based on one or more range values;
b) generating the transmission radar signal; and
c) determining one or more calibration factors based on the simulated return-signal, the transmission radar signal, and ideal return signal characteristics; wherein generating the simulated return signal includes programmably frequency dividing a known signal, and modulating the transmission radar signal based on the divided known signal.

2. The method of claim 1, wherein the transmission radar signal is a fixed frequency signal.

3. The method of claim 1, wherein the one or more calibration factors include at least one amplitude calibration factor.

4. The method of claim 1, further comprising:
determining if the radar system is in at least one of a calibration mode or normal mode of operation; and
performing a)-c) if the radar system is determined to be in the calibration mode of operation.

5. The method of claim 4, further comprising applying the determined calibration factors to actual radar return signals, if the radar system is determined to be in a normal mode of operation.

6. A radar system for performing self calibration, the system comprising:
a first component configured to generate a simulated return signal based on one or more range values;
a transmitter configured to generate a transmission radar signal;
a receiver configured to process the simulated return signal based on the transmission radar signal, the receiver comprising:
a mixer configured to receive the simulated return signal and the transmission radar signal;
a low noise amplifier coupled to an output of the mixer;
a high pass filter coupled to an output of the low noise amplifier;
an analog to digital converter coupled to an output of the high pass filter; and
a fast Fourier transform unit coupled to an output of the analog to digital converter; and
a second component configured to determine one or more calibration factors based on the processed simulated return signal and ideal return signal characteristics;
wherein the radar system comprises a Frequency Modulated Continuous Wave (FMCW) radar altimeter system; and wherein the first component includes a programmable frequency divider configured to create at least one sideband of a known signal, the first component further configured to modulate the transmission radar signal based on the divided known signal.

7. The system of claim 6, wherein the transmission radar signal is a fixed frequency signal.

8. The system of claim 6, wherein the one or more calibration factors include at least one amplitude calibration factor.

9. The system of claim 6, further comprising:
a third component configured to determine if the radar system is in at least one of a calibration mode or normal mode of operation.

10. The system of claim 9, further comprising:
a fourth component configured to apply the determined calibration factors to actual radar return signals, if the radar system is determined to be in a normal mode of operation.

11. A radar altimeter system for an aircraft, the system comprising:
a simulator configured to generate a simulated return signal based on one or more range values;
a transmitter in operative communication with the simulator and configured to generate a transmission radar signal;
a receiver in operative communication with the transmitter and configured to process the simulated return signal based on the transmission radar signal, the receiver comprising:
a mixer configured to receive the simulated return signal and the transmission radar signal;
a low noise amplifier coupled to an output of the mixer;
a high pass filter coupled to an output of the low noise amplifier;
an analog to digital converter coupled to an output of the high pass filter; and
a fast Fourier transform unit coupled to an output of the analog to digital converter; and
a processor in operative communication with the receiver and configured to determine one or more calibration factors based on the processed simulated return signal and ideal return signal characteristics;
wherein the radar altimeter system comprises a Frequency Modulated Continuous Wave (FMCW) radar altimeter system; and wherein the simulator comprises:
a first frequency divider;
a second frequency divider in operative communication with the first frequency divider
a programmable frequency divider in operative communication with the second frequency divider;
a modulator in operative communication with the programmable frequency divider;
a first attenuator in operative communication with the modulator; and
a second attenuator in operative communication with the modulator.

12. The system of claim 11, wherein the programmable frequency divider is configured to generate one desired frequency at a time that corresponds to one expected frequency in the receiver during operation.

13. The system of claim 11, wherein the transmitter further comprises:
a direct digital synthesizer;
a mixer in operative communication with the direct digital synthesizer;
a digital phase lock loop in operative communication with the mixer; and
a band pass filter in operative communication with the digital phase lock loop.

14. The system of claim 11, wherein the fast Fourier transform unit produces a digital version in the frequency domain of a signal output from the analog to digital converter.

* * * * *